Sept. 3, 1946.　　　　M. G. McBRIDE　　　　2,406,887
ELECTRICAL RATIOMETER
Filed July 22, 1943　　　　2 Sheets-Sheet 1

INVENTOR.
Maurice Graham McBride
BY
ATTORNEYS

Sept. 3, 1946.　　　　M. G. McBRIDE　　　　2,406,887
ELECTRICAL RATIOMETER
Filed July 22, 1943　　　　2 Sheets-Sheet 2

INVENTOR.
Maurice Graham McBride
BY
ATTORNEYS

Patented Sept. 3, 1946

2,406,887

UNITED STATES PATENT OFFICE 2,406,887

ELECTRICAL RATIOMETER

Maurice Graham McBride, Enfield, Middlesex, England, assignor to Sangamo Electric Company, Springfield, Ill.

Application July 22, 1943, Serial No. 495,775
In Great Britain August 5, 1942

6 Claims. (Cl. 171—95)

The present invention concerns improvements in or relating to electrical indicating instruments of the ratiometer or ohmmeter type and in particular to electrical indicating instruments working on the principle of a permanent magnet with a moving coil system.

It is well-known to construct ratiometers, ohmmeters or the like with a moving coil system comprising two coils which operate in a non-uniform magnetic field, the arrangement being such that if when currents are passed through the coils the magnetic torque on each coil due to the strength of the magnetic field in which it lies differs, that is to say, if the product of the strength of current, number of turns and strength of magnetic field for the two coils varies then the coil system will move. By suitably selecting the nature of variation of the magnetic field, the movement can be such that eventually the torques on the two coils will balance one another and the position taken up by a pointer connected to the moving system will be a measure of the ratio of the two currents. The scale can be suitably calibrated for different ratios and the instrument can be used either for measuring the ratio of two currents or possibly the ratio of two electrical quantities, such as, voltage and current in which case the reading given can be in ohms as a measurement of resistance. Normally variation of voltage will not effect the reading as no restoring spring is employed. A variation of voltage will also have little or no effect if a small restoring spring of purely nominal strength is provided to restore the moving coil system and pointer to a starting position. If a restoring spring is used of any appreciable strength then the reading tends to become a reading of the differences of the currents if the number of turns on the two coils are equal and not a measurement of their ratio.

In known arrangements it is usual for the two coils to cross or to be inclined with respect to each other but where it has been proposed to have the coils parallel to each other the whole core has been mounted eccentrically with respect to the pole pieces.

It is an object of the present invention to simplify the manufacture of such ratiometers and to obtain this result with the minimum variation from the standard designs of magnetic circuits for moving coil instruments preferably by the removal of magnetic material from the air gap.

According to the present invention a ratiometer or the like includes a moving system comprising two coils parallel to each other and pivoted on an axis between the pole pieces of the permanent magnet, the coils embracing a magnetic core, characterised in that inner surfaces of the pole pieces and outer surfaces of the core have the same axis as the coils, a portion or portions of said surfaces being removed or cut away so as to create a non-uniform magnetic field in which the coils move whereby variations of current in the two coils cause the coils to take up a position dependent on the relative magnitudes of such variations. It will be clear that the only change from the magnetic system of a standard moving coil instrument is effected by the removal of magnetic material in the air gap or gaps. In a preferred construction magnetic material is removed from one air gap only so that in the other gap the magnetic field is substantially uniform.

The invention will be better understood by referring to the accompanying drawings which illustrate two examples of carrying the invention into effect.

Figure 1:
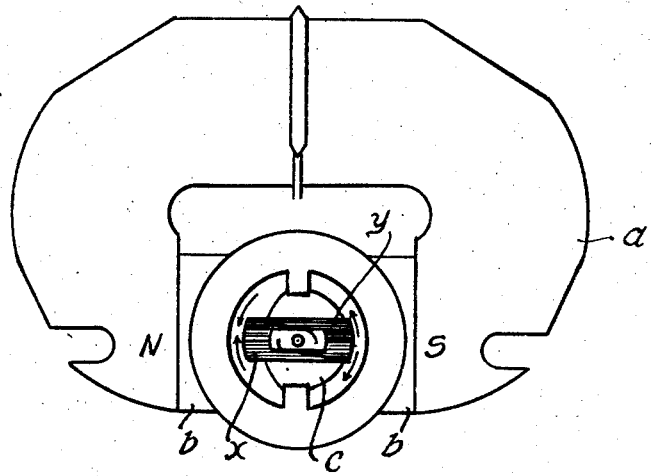
Fig. 1 shows schematically a general view of the instrument.
Figure 2:
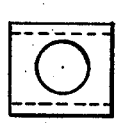
Figs. 2 and 2A show a side elevation and end view respectively of the core according to one construction.
Figure 2A:
Figure 3:
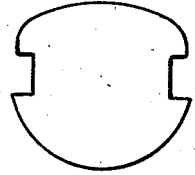
Fig. 3 shows an end view of the core according to another construction.
Figure 4:
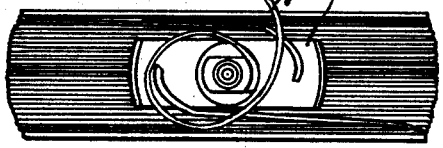
Figs. 4 and 4A show the coil looking at opposite sides and showing the connections thereat.
Figure 4A:
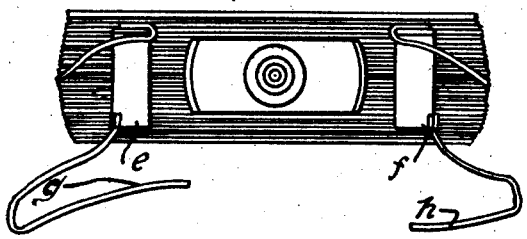
Figure 5:
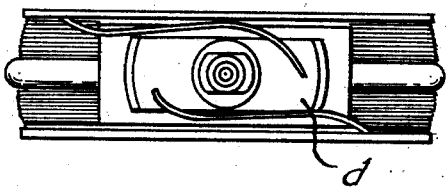
Figs. 5 and 5A show similar views of the coil wound on a preferred kind of former illustrated in Fig. 6 and having a cross section on the line A—A as shown in Fig. 7.
Figure 6:
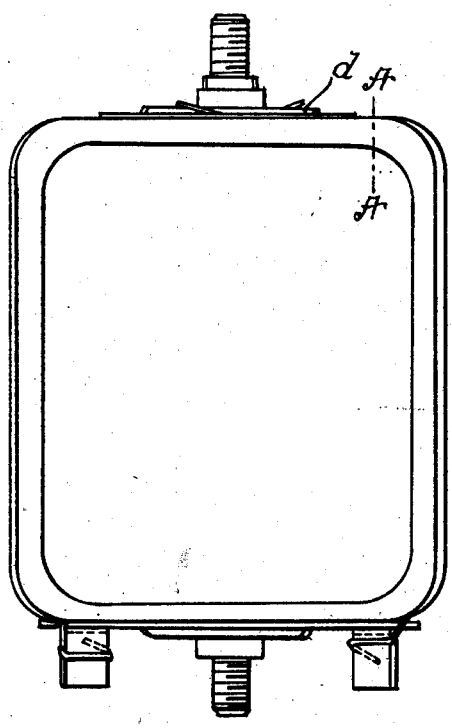
Figure 7:
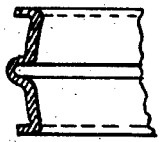
Figure 5A:
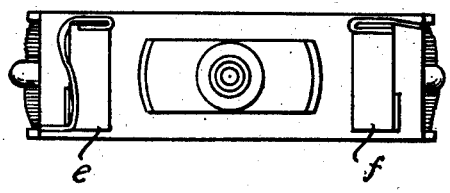

Referring to Fig. 1, $a$ represents a permanent magnet, $b$ represents the pole pieces having a cylindrical bore. Magnet $a$ and pole pieces $b$ are of standard design. To obtain the necessary flux distribution, the core is specially shaped. One method of shaping the core is to machine the radius off one side of a standard cylindrical core $c$ and to counterbore this side as shown in Figs. 2 and 2A. Another method is to machine the standard cylindrical core lengthwise on one side by means of a specially shaped cutter as shown in Fig. 3. The core is mounted in the standard position that is co-axial to the cylindrical bore of the pole pieces so that one gap is uniform radially, while the other gives a non-uniform distribution of flux. The moving coil consists of two windings wound side by side and appears as shown in Figs. 4 and 4a if the usual type of former is employed. Preferably the design of former shown in Figs. 6 and 7 is employed in which case the coil appears as shown in Figs. 5 and 5A. The common terminal of the windings is connected to the top pivot base $d$, the other ends being connected to the terminals $e$ and $f$ mounted on the coil. The movement carries the pointer and is pivoted so that one side rotates concentrically in the uniform gap, the other side rotates in the specially shaped gap. Connection to the common point of the windings is made by a spiral ligament $j$ while connection to each winding is made through U-shaped ligaments $g$ and $h$.

The direction of winding, current and magnetisation is such that the force of either coil tends to rotate that coil in a direction such that the flux density in which the coil lies (and, therefore, the torque from the coil) decreases relative to that in which the other coil lies. This is the general condition for stability. Suitable directions are indicated in Fig. 1, the arrows representing the direction of the torque produced by each coil.

The control exercised by the ligament connections is negligible and the moving system rotates until the torques produced by each coil are equal and opposite.

If the currents through each coil are such that equilibrium exists and then the current in one coil is increased, while the other is held constant, the torques become unbalanced and the system will rotate. As the system rotates, the torque from the first coil decreases relative to the torque from the second until a new position of equilibrium is attained. It will be appreciated that the final position taken up by the moving system and indicated by the pointer is dependent on the relative values of the currents in the two coils and is independent of the absolute value of the current. Thus over a certain predetermined limited range, the pointer can be made to indicate the ratio of the currents in the two coils.

Generally it is desirable to have an instrument of uniform scale shaped so that equal increments of ratio shall cause equal angular movements of the system. This requirement is substantially met by special core shaping described in the two alternatives given above.

By having a uniform gap on one side with a specially shaped gap on the other side it is readily possible to attain the desired scale shape. All that is necessary is a simple machining process on a core of an otherwise standard construction. It will be appreciated that such a construction may be used with a "cross" or "parallel" coil, since one gap being uniform, the relative position of the coils on that side is arbitrary, although for reasons stated in the provisional specification above referred to the parallel construction is preferred.

It is usual when winding two coils on a former for use in ratiometers and the like to wind each coil separately. It is necessary in the case of cross coils and it has also been considered necessary in parallel coils but by employing a former as illustrated in Figs. 6 and 7 it is possible to wind the two coils together. The former is constructed of metal such as aluminum or copper and on the central section of the former the metal is pressed outwardly so as to form an annular ridge and serves to divide the former into two parts, one for each of the coils as clearly illustrated in Figs. 5 and 5A. It may be pointed out that while this does reduce the winding space it is in fact an advantage because the turns of the coils which are nearest to one another have little effect and in fact where they overlap they have no effect at all and simply act as an increased resistance in circuit with the active turns of the coils and in addition they increase the overall weight of the moving system.

This arrangement therefore, of a central ridge or other similar dividing means has the advantage of requiring less turns and rendering what turns are provided more active.

I claim:

1. In a ratiometer or the like, the combination of a magnet comprising first and second pole pieces, a solid core disposed between said pole pieces, coil means rotatably mounted on a stationary pivot axis and surrounding said core, a first pair of inner and outer surfaces on said first pole piece and on said core respectively defining a first air gap therebetween at one side of said core, said first pair of surfaces being concentric with respect to the stationary pivot axis of said coil means so that said first air gap is of uniform width and acts with a substantially uniform magnetic field on one side of said coil means, and a second pair of inner and outer surfaces on said second pole piece and on said core respectively defining a second air gap therebetween substantially at the opposite side of said core, one of said surfaces of said second pair being non-concentric with respect to the stationary pivot axis of said coil means so that said second air gap is of non-uniform width throughout substantially the entire length of gap traversed by the other side of said coil means and acts with a substantially non-uniform magnetic field on the other side of said coil means.

2. In an instrument of the class described, the combination of a magnet comprising first and second pole pieces, a solid core disposed between said pole pieces, a moving system comprising two coils parallel to each other and surrounding said core, said moving system being rotatably mounted on a stationary pivot axis for rotative movement in either direction from a median position, a first pair of inner and outer surfaces on said first pole piece and on said core respectively defining a first air gap therebetween at one side of said core, said first pair of surfaces being concentric with respect to the stationary pivot axis of said two coils so that said first air gap is of uniform width and acts with a substantially uniform magnetic field on one side of said two coils, and a second pair of inner and outer surfaces on said second pole piece and on said core respectively defining a second air gap therebetween at the opposite side of said core from said first air gap, one of said surfaces of said second pair being non-concentric with respect to the stationary pivot axis of said two coils so that said second air gap is of non-uniform width throughout the effective angular rotation of the other side of said two coils and acts with a substantially non-uniform magnetic field on the other side of said two coils.

3. In a ratiometer or the like, the combination of a magnet comprising first and second pole pieces, a solid core disposed between said pole pieces, coil means rotatably mounted on a stationary pivot axis and surrounding said core, a first pair of inner and outer surfaces on said first pole piece and on said core respectively defining a first air gap therebetween at one side of said core, said first pair of surfaces being concentric with respect to the stationary pivot axis of said coil means so that said first air gap is of uniform width and acts with a substantially uniform magnetic field on one side of said coil means, and a second pair of inner and outer surfaces on said second pole piece and on said core respectively defining a second air gap therebetween at the opposite side of said core, said outer surface of the second pair, formed on said core, being eccentric with respect to the inner surface of said second pair so that this second air gap is of non-uniform width over that portion of its length which is traversed by the other side of said coil means and acts with a substantially non-uniform magnetic field on the other side of said coil means.

4. In an instrument of the class described, the combination of a magnet comprising first and second pole pieces, a core disposed between said pole pieces, a moving system comprising two coils parallel to each other and surrounding said core, said moving system being rotatably mounted on a stationary pivot axis for rotative movement in either direction from a median position, a first pair of inner and outer surfaces on said first pole piece and on said core respectively defining a first air gap therebetween at one side of said core, said first pair of surfaces being concentric with respect to the stationary pivot axis of said two coils so that said first air gap is of uniform width and acts with a substantially uniform magnetic field on one side of said two coils, and a second pair of inner and outer surfaces on said second pole piece and on said core respectively defining a second air gap therebetween at the opposite side of said core from said first air gap, said outer surface of the second pair, formed on said core, being of more obtuse curvature than the inner surface of said second pair, whereby said second air gap is of greatest width at a median point and reduces in width in opposite directions from this median point so that said second air gap acts with a substantially non-uniform magnetic field on the other side of said two coils.

5. In an instrument of the class described, the combination of a magnet comprising first and second pole pieces, a core disposed between said pole pieces, a moving system rotatably mounted on a stationary pivot axis for rotative movement in either direction from a median position, said moving system comprising a former surrounding said core and provided with a raised dividing ridge extending along each side portion of said former substantially medially thereof, two coils mounted in parallel relation on said former, one on each side of said dividing ridge, said two coils having their turns spanning the entire core so as to be active in air gaps at opposite sides of said core, a first pair of inner and outer surfaces on said first pole piece and on said core respectively defining a first air gap therebetween at one side of said core, said first pair of surfaces being concentric with respect to the stationary pivot axis of said moving system so that said first air gap is of uniform width and acts with a substantially uniform magnetic field on one side of said two coils, and a second pair of inner and outer surfaces on said second pole piece and on said core respectively defining a second air gap therebetween substantially at the opposite side of said core, one of said surfaces of said second pair being non-concentric with respect to the stationary pivot axis of said moving system so that said second air gap is of non-uniform width throughout substantially the entire length of gap traversed by the other side of said two coils and acts with a substantially non-uniform magnetic field on the other side of said two coils.

6. In an instrument of the class described, the combination of a magnet comprising first and second pole pieces, a core disposed between said pole pieces, a moving system comprising two coils parallel to each other and surrounding said core, said moving system being rotatably mounted on a stationary pivot axis, a first pair of inner and outer surfaces on said first pole piece and on said core respectively defining a first air gap therebetween at one side of said core, said first pair of surfaces being concentric with respect to the stationary pivot axis of said two coils, a second pair of inner and outer surfaces on said second pole piece and one said core respectively defining a second air gap therebetween at the opposite side of said core from said first air gap, one of said surfaces of said second pair being non-concentric with respect to the stationary pivot axis of said two coils, a spiral ligament connected to one end of each coil, and U-shaped ligaments connected to the other ends of both coils, said ligaments enabling connections being made with both coils from stationary terminals while permitting of a substantially free movement of said coils about said stationary pivot axis.

MAURICE GRAHAM McBRIDE.